(12) United States Patent
Mishiro et al.

(10) Patent No.: US 10,084,210 B2
(45) Date of Patent: Sep. 25, 2018

(54) ELECTROCHEMICAL CELL MODULE

(71) Applicant: Hitachi Chemical Company, Ltd., Chiyoda-ku, Tokyo (JP)

(72) Inventors: Yuichiro Mishiro, Tokyo (JP); Masahiko Amano, Tokyo (JP); Masanori Niida, Osaka (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 935 days.

(21) Appl. No.: 14/381,274

(22) PCT Filed: Feb. 28, 2013

(86) PCT No.: PCT/JP2013/055418
§ 371 (c)(1),
(2) Date: Aug. 27, 2014

(87) PCT Pub. No.: WO2013/129574
PCT Pub. Date: Sep. 6, 2013

(65) Prior Publication Data
US 2015/0104675 A1    Apr. 16, 2015

(30) Foreign Application Priority Data

Feb. 28, 2012 (JP) ................................ 2012-042307

(51) Int. Cl.
*H01M 10/42* (2006.01)
*H01M 10/48* (2006.01)
(Continued)

(52) U.S. Cl.
CPC ............ *H01M 10/425* (2013.01); *H01G 2/04* (2013.01); *H01G 9/26* (2013.01); *H01G 11/10* (2013.01);
(Continued)

(58) Field of Classification Search
CPC .......................... H01M 2/0245; H01M 2/105
See application file for complete search history.

(56) References Cited

U.S. PATENT DOCUMENTS

2002/0102457 A1*  8/2002  Oogami ............... B60L 3/0046
                                                        429/159
2007/0132429 A1*  6/2007  Onuki ................ H01M 2/1016
                                                        320/116
(Continued)

FOREIGN PATENT DOCUMENTS

JP    2002-157984 A    5/2002
JP    2007-165134 A    6/2007
(Continued)

OTHER PUBLICATIONS

International Search Report dated Apr. 16, 2013 (One (1) page).

*Primary Examiner* — Barbara Lee Gilliam
*Assistant Examiner* — Nathanael T Zemui
(74) *Attorney, Agent, or Firm* — Crowell & Moring LLP (57) ABSTRACT

Provided is an electrochemical cell module in which a plurality of electrochemical cell modules may be used in a combined state. In an electrochemical cell module 1 where both ends of six cylindrical electrochemical cells (lithium ion battery cells 3) electrically connected to one another and arranged juxtaposedly are respectively held by a pair of cell holders 5 and 7, and a control circuit holder 9 is attached to an outside of the cell holder 5, which is one of the pair of the cell holders 5 and 7. The control circuit holder 9 receives a control circuit 41 operable to control voltages of the six lithium ion battery cells.

2 Claims, 5 Drawing Sheets

(51) Int. Cl.
*H01M 2/10* (2006.01)
*H01G 9/26* (2006.01)
*H01G 11/10* (2013.01)
*H01G 11/82* (2013.01)
*H01G 2/04* (2006.01)
*H01M 2/20* (2006.01)

(52) U.S. Cl.
CPC .......... *H01G 11/82* (2013.01); *H01M 2/1016* (2013.01); *H01M 10/4207* (2013.01); *H01M 10/482* (2013.01); *H01M 2/105* (2013.01); *H01M 2/202* (2013.01); *H01M 2010/4271* (2013.01); *H01M 2010/4278* (2013.01); *Y02E 60/13* (2013.01)

(56) References Cited

U.S. PATENT DOCUMENTS

| | | | | |
|---|---|---|---|---|
| 2010/0141214 A1* | 6/2010 | Yoon | ........................ | B60K 6/28 |
| | | | | 320/134 |
| 2011/0097619 A1* | 4/2011 | Park | ..................... | H01M 2/105 |
| | | | | 429/159 |

FOREIGN PATENT DOCUMENTS

| JP | 2011-96621 A | 5/2011 |
|---|---|---|
| WO | WO 2011/093105 A1 | 8/2011 |

* cited by examiner

ELECTROCHEMICAL CELL MODULE

TECHNICAL FIELD

The present invention relates to an electrochemical cell module comprising a plurality of cylindrical electrochemical cells electrically connected to one another and arranged juxtaposedly and a pair of cell holders for holding both ends of the cylindrical electrochemical cells.

BACKGROUND ART

In order to obtain a desired voltage or a desired capacity, it is a common practice to combine a plurality of electrochemical cells using holders to form an assembled battery and further to receive a combination of one or more assembled batteries in a case to form an electrochemical cell module for use (for example as disclosed in FIGS. 2 and 9 of JP2002-157984A [Patent Document 1]). A control circuit is provided in the case configured to receive the electrochemical cells such as lithium ion batteries or lithium capacitors. The control circuit is operable to perform voltage control of each electrochemical cell and each assembled battery, and so forth. The case is useful for efficiently receiving the one or more assembled batteries, protecting the electrochemical cells, and carrying the electrochemical cell modules.

PRIOR ART DOCUMENTS

Patent Documents

Patent Document 1: JP2002-157984A

SUMMARY OF THE INVENTION

Technical Problem

When protection of the electrochemical cells is not regarded to be important or when it is not necessary to use the electrochemical cell module for an application where the electrochemical cell module is constantly oscillated, the case is not necessarily needed. Conventionally, in such situation, the case or a structure similar to the case is necessary for receiving the control circuit. Thus, the need for the case or the structure similar to the case increases costs of the electrochemical cell module.

An object of the present invention is to provide an electrochemical cell module in which a plurality of electrochemical cells may be used in a combined state using holders in order to reduce manufacturing costs.

Another object of the present invention is to enhance heat dissipation efficiency of electrochemical cells.

A further object of the present invention is to provide an electrochemical cell module in which control malfunction due to noise is unlikely to occur.

Solution to Problem

An electrochemical cell module of the present invention comprises: a plurality of cylindrical electrochemical cells electrically connected to one another and arranged juxtaposedly; a pair of cell holders configured to respectively hold both ends of the plurality of cylindrical electrochemical cells; a control circuit operable to control voltages of the plurality of cylindrical electrochemical cells; and a control circuit holder configured to receive the control circuit therein and attached to an outside of one of the pair of cell holders. When the control circuit holder configured to receive the control circuit therein is attached to the one of the pair of cell holders, the control circuit may be mounted to the module without the need for a case. Then, an assembled battery formed by using the pair of cell holders may be used without alteration as the electrochemical cell module. Further, since there is no case, heat to be generated by the electrochemical cells is hardly confined. Thus, heat dissipation efficiency of the electrochemical cells may be increased.

A terminal holder including a pair of input/output terminals and an external connection terminal portion may be attached to the other of the pair of cell holders. By supplying electric power to an apparatus that operates using the electrochemical cell module as a power source, and by providing the input/output terminals to which a charging current is supplied and the external terminal portion for inputting/outputting control information to/from the control circuit in the cell holder opposed to the side to which the control circuit holder is attached, a large installation space of the control circuit may be secured.

Though the control circuit holder may have an arbitrary configuration, the control circuit holder may include an opposed wall portion opposed to the one of the pair of cell holders, and the opposed wall portion may be formed with one or more lead wire insertion through holes. In this case, a plurality of lead wires operable to electrically connect the plurality of cylindrical electrochemical cells and the control circuit may be inserted into the control circuit holder through the one or more lead wire insertion through holes, and the plurality of lead wires and the control circuit may be connected via a connector. With such an arrangement, the lead wires and the control circuit may be electrically connected with the control circuit electrically insulated from the electrochemical cells.

The plurality of lead wires, for example, include: voltage detection wires extending from the respective cylindrical electrochemical cells to the control circuit and operable to detect voltages of the respective cylindrical electrochemical cells; and signal wires extending from the control circuit to the external connection terminal portion for signal wire connection located in the other of the pair of cell holders. Preferably, the electrochemical cell module further comprises one or more insulating guide members disposed between the pair of cell holders and each having a passage therein, and the voltage detection wires and the signal wires are passed through the passages. When the one or more insulating guide members comprise a first insulating guide member and a second insulating guide member, the voltage detection wires may be passed through the first insulating guide member, and the signal wires may be passed through the second insulating guide member. By separately passing the voltage detection wires and the signal wires, the voltage detection wires and the signal wires do not interfere with each other. Malfunction of the control circuit due to noise and so forth may be prevented.

Preferably, the one or more insulating guide members each have a splittable structure to be split into two at a splitting plane assumed along the passage. With such an arrangement, each insulating guide member may be manufactured at lower cost and more readily than in a case where the insulating guide member is unitarily formed. Further, the lead wires provided with connectors may be passed through the passages.

BRIEF DESCRIPTION OF THE DRAWINGS

FIGS. 1A to 1C are diagrams showing an example of an electrochemical cell module of the present invention, wherein FIG. 1A is a front view, FIG. 1B is a plan view, FIG. 1C is a left side view, and FIG. 1D is a right side view of the example electrochemical cell module.

FIGS. 5A to 5D are diagrams showing an example of an insulating guide member forming part that constitutes an insulating guide member to be used in the present invention, wherein FIG. 5A is a plan view.

DESCRIPTION OF EMBODIMENT

An example of an embodiment of an electrochemical cell module of the present invention will be described below with reference to drawings.

An electrochemical cell module 1 in this embodiment mainly comprises cylindrical lithium ion battery cells 3, specifically six cylindrical electrochemical cells electrically connected to one another and arranged juxtaposedly, a pair of cell holders 5 and 7 configured to hold both ends of the lithium ion battery cells 3, a control circuit holder 9 attached to one cell holder 5, and a terminal holder 11 attached to the other cell holder 7, as shown in FIGS. 1A to 1D. In addition to the lithium ion battery cells 3, four reinforcing metal bars 13 with end portions thereof fixed to respective corner portions of the pair of the cell holders 5 and 7, and a first insulating guide member 15 and a second insulating guide member 17 (refer to FIG. 2) fixed to the lithium ion battery cells 3 and the pair of the cell holders 5 and 7 are disposed between the pair of cell holders 5, 7.

Figure 2A:
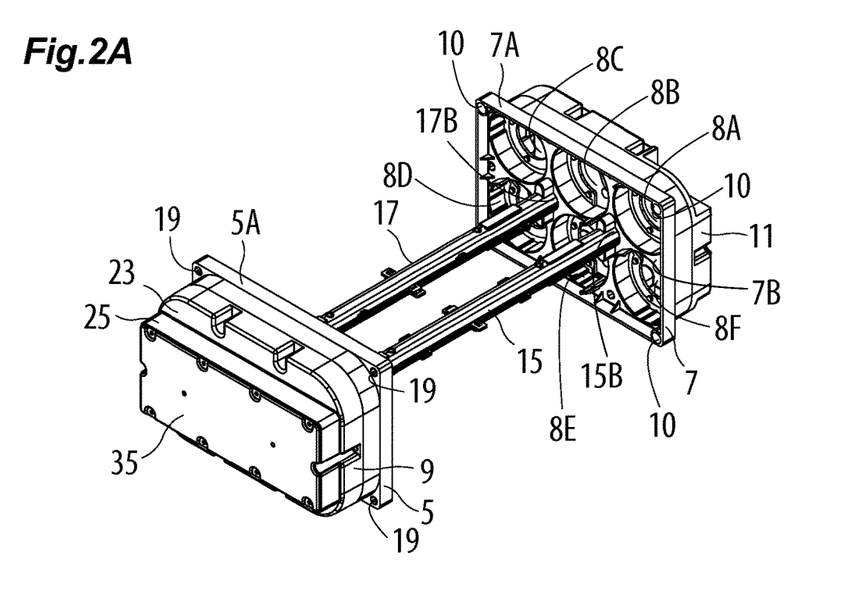
FIG. 2A is a perspective view of the electrochemical cell module of the present invention as seen from the side of one of cell holders wherein electrochemical cells (lithium ion battery cells) are removed.
Figure 2B:
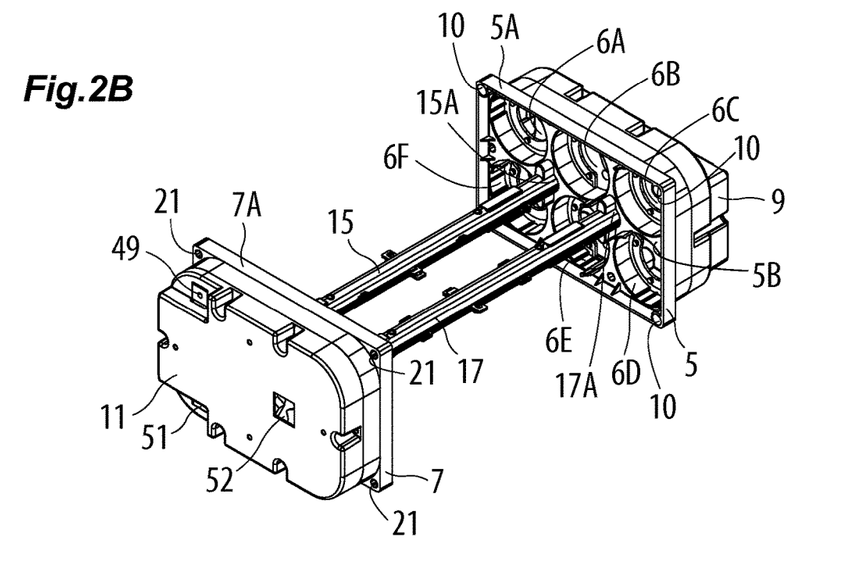
FIG. 2B is a perspective view of the electrochemical cell module of the present invention as seen from the side of the other of cell holders wherein electrochemical cells (lithium ion battery cells) are removed.
Figure 3A:
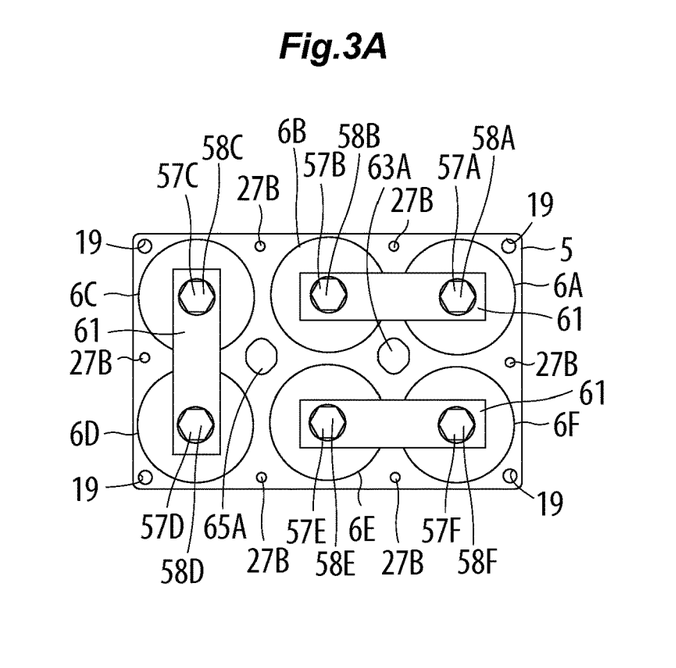
FIG. 3A is a left-side schematic diagram of the electrochemical cell module of the present invention with a control circuit holder removed therefrom.
Figure 3B:
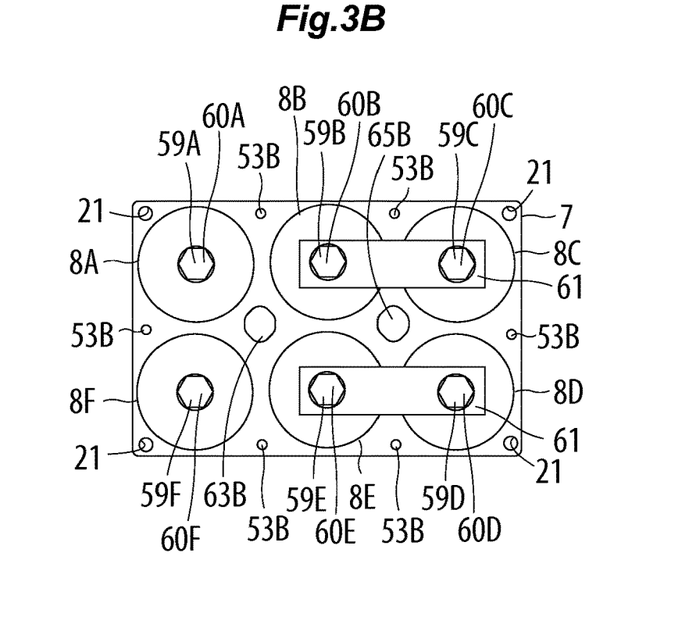
FIG. 3B is a right-side schematic diagram of the electrochemical cell module of the present invention with a terminal holder removed therefrom.

FIG. 2A is a perspective view of the electrochemical cell module 1 as seen from the side of the cell holder 5 wherein the lithium ion battery cells 3 and the reinforcing metal bars 13 are removed. FIG. 2B is a perspective view of the electrochemical cell module 1 as seen from the side of the cell holder 7 wherein the lithium ion battery cells 3 and the reinforcing metal bars 13 are removed. FIG. 3A is a left-side schematic diagram of the electrochemical cell module 1 showing the cell holder 5 with the control circuit holder 9 removed therefrom. FIG. 3B is a right-side schematic diagram of the electrochemical cell module 1 showing the cell holder 7 with the terminal holder 11 removed therefrom. The pair of the cell holders 5 and 7 includes cell terminal receiving concave portions 6A to 6F and 8A to 8F of a columnar shape configured to receive end portions of the six lithium ion battery cells 3 therein and each including a projecting portion that is convex outward. A peripheral wall portion 5A of the cell holder 5 and a peripheral wall portion 7A of the cell holder 7 each have a contour of a rectangular shape. Then, four corners inside each of the peripheral wall portions 5A and 7A of the cell holders 5 and 7 are each unitarily formed with a cylindrical portion 10 into which an end portion of one of the reinforcing metal bars 13, which will be described later, is inserted. A bottom wall portion 5B of the cell holder 5 is formed with lead-wire lead-out holes 63A and 65A. A bottom wall portion 7B of the cell holder 7 is formed with lead-wire lead-out holes 63B and 65B. The lead-wire lead-out holes 63A and 63B are provided corresponding to the first insulating guide member 15. The lead-wire lead-out holes 65A and 65B are provided corresponding to the second insulating guide member 17.

The control circuit holder 9 is fixed to an outside of the cell holder 5 with screws, and the terminal holder 11 is fixed to an outside of the cell holder 7 with screws. Four corners of the bottom wall portion 5B of the cell holder 5 are formed with through holes 19 that communicate with the cylindrical portions 10 to fix the reinforcing metal bars 13. Likewise, four corners of the bottom wall portion 7B of the cell holder 7 are formed with through holes 21 that communicate with the cylindrical portions 10 to fix the reinforcing metal bars 13. The reinforcing metal bars 13 are fixed by fitting the end portions of the reinforcing metal bars 13 in the cylindrical portions 10, inserting screws 20 into the through holes 19 and inserting screws 22 into the through holes 21, and then inserting the screws into screw holes provided in the end portions of the reinforcing metal bars 13.

The cell terminal receiving concave portions are disposed to be opposed to each other, as with the cell terminal receiving concave portions 6A and 8A and as with the cell terminal receiving concave portions 6B and 8B. A through hole is formed in each bottom portion of the cell terminal receiving concave portions 6A to 6F and 8A to 8F. A screw portion constituting a terminal provided at each end portion of each lithium ion battery cell 3 passes through the through hole. Bus bars 61 are fixed to the screw portions that have passed through these through holes and then come out of the cell holders 5 and 7, using nuts 57A to 59E.

Figure 1A:
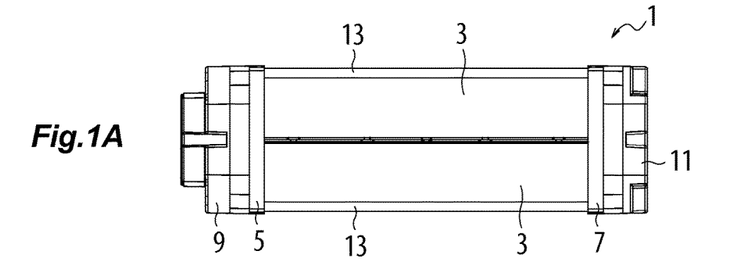
Figure 1B:
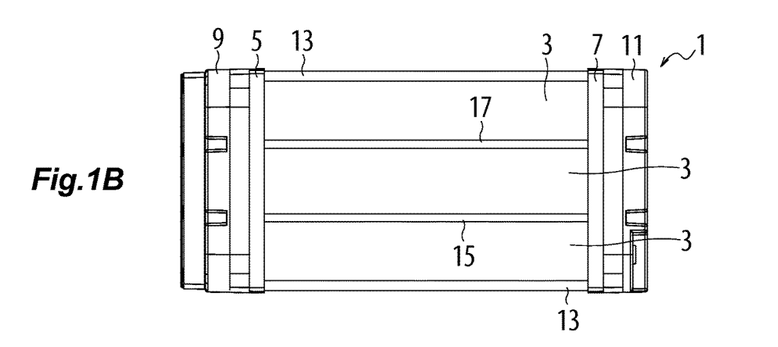
Figures 1C, 1D:
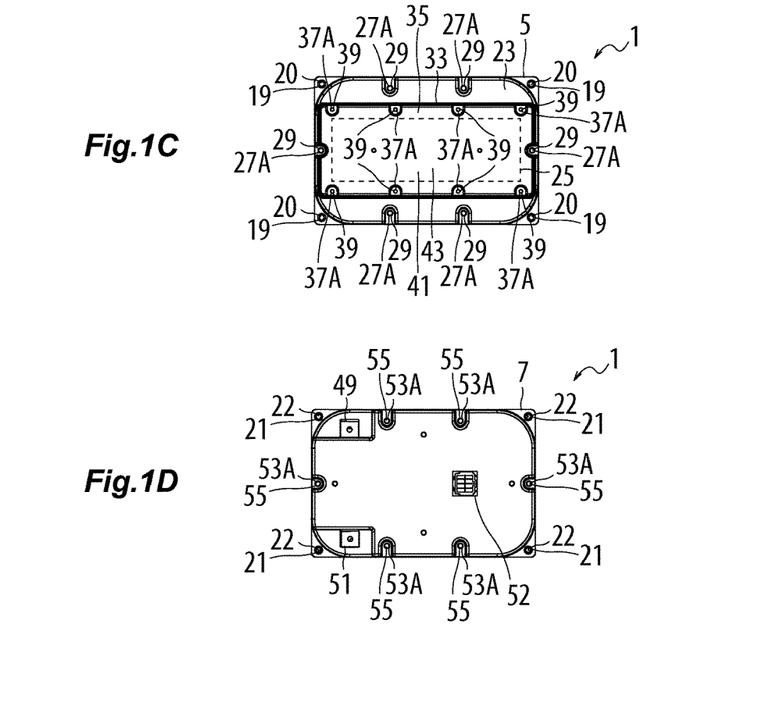

The control circuit holder 9 includes a bus bar receiving portion 23 configured to cover the bus bars 61 disposed outside the cell holder 5 and with one surface thereof opened, and a control circuit substrate receiving unit 25 partially unitarily formed with the bus bar receiving unit 23 and configured to receive a control circuit substrate therein. The control circuit substrate receiving unit 25 is formed so that one surface thereof is open, and the opening portion thereof is closed by a lid plate 35. The bus bar receiving unit 23 has a rectangular shape in which curved portions are formed at four corners of the bus bar receiving unit 23. Six screw holes 27A are provided in the bus bar receiving unit 23, and the bus bar receiving portion 23 is fixed to bottomed screw holes 27B provided in the cell holder 5 with screws 29. The control circuit substrate receiving unit 25 is disposed on the bus bar receiving unit 23 close to the central portion of the bus bar receiving unit 23, as shown in FIG. 1C. The control circuit substrate receiving unit 25 comprises a partition portion 31 located between the bus bar receiving unit 23 and the control circuit substrate receiving unit 25, a peripheral wall portion 33 rising from the bus bar receiving unit 23, and the lid plate 35. Eight through holes 37A are formed in the lid plate 35, and the lid plate 35 is fixed to bottomed screw holes 37B provided in matching positions of the peripheral wall portions with screws 39.

Figure 4:
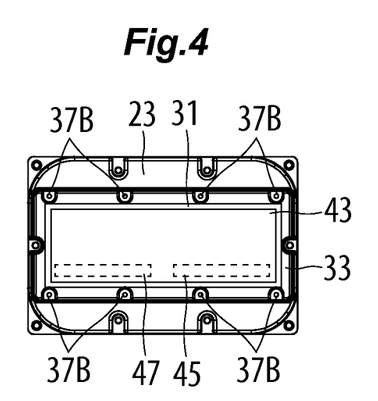
FIG. 4 is a left side view of the electrochemical cell module of the present invention with a lid plate removed therefrom.
Figure 5A:
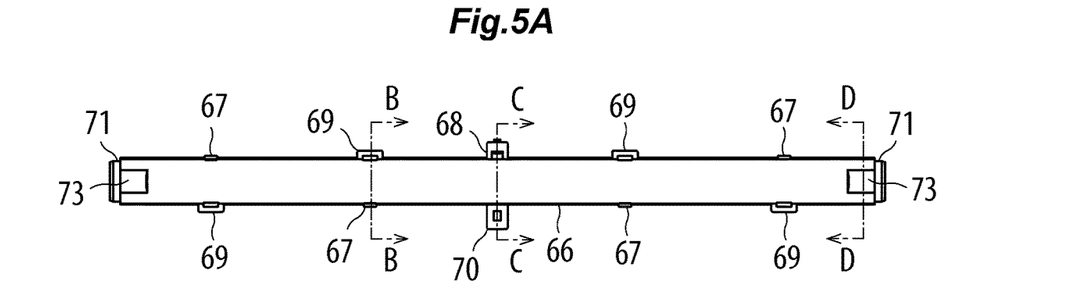
Figure 5B:
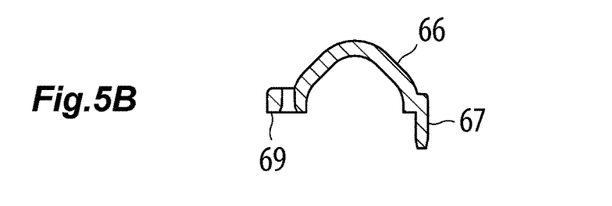
FIG. 5B is an end view taken along line B-B of FIG. 5A.
Figure 5C:
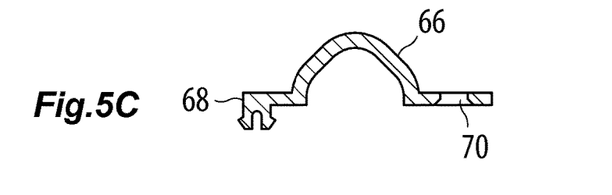
FIG. 5C is an end view taken along line C-C of FIG. 5A.
Figure 5D:
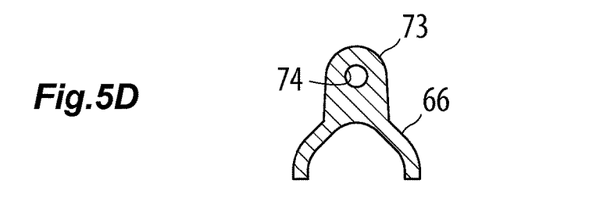
FIG. 5D is an end view taken along line D-D of FIG. 5A.

A control circuit substrate 43 with a control circuit 41 mounted thereto is disposed in a space formed in the control circuit substrate receiving unit 25, as indicated by a dotted line in FIG. 1C. FIG. 4 is a diagram showing the lid plate 35 as being transparent, and shows the control circuit substrate 43 with circuit elements omitted therefrom. As shown in dotted lines in FIG. 4, lead wire insertion through holes 45 and 47 are provided in the partition portion 31 so that lead wires (voltage detection wires and signal wires), which will be described later, are passed through the lead wire insertion through holes 45 and 47. The control circuit substrate 43 and the lithium ion battery cells 3 are electrically insulated by presence of the partition portion 31.

The terminal holder 11 covers the bus bars 61 and terminal portions, like the bus bar receiving portion 23, and has a rectangular shape including curved portions at four corners thereof. The terminal holder 11 includes input/output terminals formed of a pair of a positive electrode terminal 49 and a negative electrode terminal 51 and a portion of an external connection terminal 52 operable to input/output a control signal for the control circuit 41. Six screw holes 53A are provided in the terminal holder 11, and the terminal holder 11 is fixed to bottomed screw holes 53B provided in the cell holder 7 with screws 55.

In this embodiment, the six lithium battery cells 3 are connected in series by the bus bars 61. Orientations of positive and negative electrodes of each lithium ion battery cell 3 and connection by the bus bars 61 are determined so that a terminal portion 60A is a positive (+) electrode and a terminal portion 60F is a negative (−) electrode. Specifically, orientations of the lithium ion battery cells 3 are aligned so that the positive electrode appears at each of the terminal portions 60A, 60C and 60E and the negative electrode appears at each of terminal portions 60B, 60D and 60F. Then, terminal portions 58A and 58B are connected by the bus bar 61. Likewise, the terminal portions 60B and 60C, terminal portions 58C and 58D, the terminal portions 60D and 60E, and terminal portions 58E and 587F are connected by the bus bar 61. In addition, the terminal portion 60A is electrically connected to the positive electrode terminal 49, while the terminal portion 60F is connected to the negative electrode terminal 51.

The first insulating guide member 15 and the second insulating guide member 17 are each cylindrical in shape having a cross-section of an ellipse, and each have a passage therein. One end 15A of the first insulating guide member 15 is fixedly aligned to the lead-wire lead-out hole 63A of the cell holder 5, and the other end 15B of the first insulating guide member 15 is fixedly aligned to the lead-wire lead-out hole 63B of the cell holder 7. One end 17A of the second insulating guide member 17 is fixedly aligned to the lead-wire lead-out hole 65A of the cell holder 5, and the other end 17B of the second insulating guide member 17 is fixedly aligned to the lead-wire lead-out hole 65B of the cell holder 7.

In order to control charging and discharging, monitor overcharging and overdischarging, and so forth based on the voltage value of the lithium ion battery cell 3, the electrochemical cell module 1 in this embodiment includes voltage detection wires (not shown) operable to detect voltages between terminals of the lithium ion battery cells and signal wires (not shown) operable to perform communication between the control circuit 41 and an external control section. The voltage detection wires and the signal wires are passed through the first insulating guide member 15 and the second insulating guide member 17. That is, one end of each voltage detection wire (not shown) provided for each lithium battery cell 3 is electrically connected to corresponding one of terminal portions 59A to 59F and enters into the first insulating guide member 15 through the lead-wire lead-out hole 63B. The other end of each voltage detection wire is connected to the control circuit substrate 43 via a connector through the lead-wire lead-out hole 63A and the lead-wire insertion through hole 45. One end of each signal line (not shown) is connected to the control circuit substrate 43 via the connector, and enters into the second insulating guide member 17 from the lead-wire lead-out hole 65A through the lead wire insertion through hole 47. The other end of each signal wire comes out from the lead-wire lead-out hole 65B and is connected to the external connection terminal 52. By separately connecting the voltage detection wires and the signal wires to the first insulating guide member 15 and the second insulating guide member 17 respectively in this manner, the voltage detection wires and the signal wires do not electrically interfere with each other. Malfunction of the control circuit due to noise or the like may be prevented. The first insulating guide member 15 and the second insulating guide member 17 are each designed to have an elliptical section rather than a circular section for the purpose of disposing the lithium ion battery cells 3 apart from the voltage detection wires and the signal wires respectively passing through the first and second insulating guide members 15, 17.

The first insulating guide member 15 and the second insulating guide member 17 each have a splittable structure to be split into two at a splitting plane assumed along the passage. As shown in FIGS. 5A to 5D, two U-letter shaped cylindrical guide member forming parts 66 are combined into a cylinder for use as the guide members. Engaging hook portions 67 and engaged portions 69, and a fitting hook portion 68 and a fitted portion 70 are formed at the guide member forming parts 66. One hook portion 67 and one engaged portion 69 are shown in an end side view of FIG. 5B taken along line B-B of FIG. 5A. One fitting hook portion 68 and one fitted portion 70 are shown in an end side view of FIG. 5C taken along line C-C of FIG. 5A. The first insulating guide member 15 and the second insulating guide member 17 are each formed by rotating one of two guide member forming parts 66 to be combined by 180 degrees with respect to the other to align the engaging hook portions 67 and the engaged portions 69, and also to align the fitting hook portion 68 and the fitted portion 70. With such an arrangement, the first insulating guide member 15 and the second insulating guide member 17 may be each manufactured at lower cost and more readily than in a case where the first insulating guide member 15 and the second insulating guide member 17 are each unitarily formed. Further, when assembling the first insulating guide member 15 and the second insulating guide member 17, the lead wires (voltage detection wires and signal wires) with the connector connected to the ends thereof are movably sandwiched between the first insulating guide member 15 and the second insulating guide member 17 in advance, thereby facilitating the assembly of the guide members.

End portions of the guide member forming part 66 each include a fitting portion 71 and a fixing portion 73. The thickness of the fitting portion 71 is formed to be thin so that the fitting portions 71 enter into the lead-wire lead-out holes (63A and 63B for the first insulating guide member 15,65A and 65B for the second insulating guide member 17). The fixing portion 73 has a screw hole 74 shown in an end view of FIG. 5D taken along line D-D of FIG. 5A. The screw hole 74 is used in fixing the first insulating guide member 15 and the second insulating guide member 17 to the cell holders 5 and 7. When the first insulating guide member 15 and the second insulating guide member 17 are fixed to the cell holders 5 and 7, screw holes, not shown, provided in the cell holders 5 and 7 are aligned with the screw holes 74 with the fitting portions 71 inserted into the lead-wire lead-out holes, and then the first insulating guide member 15 and the second insulating guide member 17 are fixed to the cell holders 5 and 7 from outside the cell holders 5 and 7 with screws.

As described above, in the electrochemical cell module 1 in this embodiment, the control circuit 41 can be mounted to the electrochemical cell module 1 even if the electrochemical cell module 1 does not include a case. Consequently, the cost for the case may be reduced. Further, since the electrochemical cell module 1 is not surrounded by the case, heat dissipation efficiency of the lithium ion battery cells 3 may be increased.

Though the lithium ion battery cells are employed as the electrochemical cells in this embodiment, other battery cells or capacitors capable of being charged and discharged may be of course employed.

Further, though the number of the lithium ion battery cells is six in this embodiment, six is just an example of the number of the lithium ion battery cells. Four, eight, twelve, or an odd number of the lithium ion battery cells may be employed.

Further, for example, it may be so arranged that the control circuit 41 capable of performing parallel operation of two sets of six lithium ion battery cells is provided inside one module. In case a battery capacity runs short, for example, a separate electrochemical cell module which includes a set of six lithium ion battery cell and is not equipped with a control circuit may be added to perform parallel operation of the existing modules and the added module by using one control circuit 41, thereby increasing the battery capacity.

INDUSTRIAL APPLICABILITY

According to the present invention, the control circuit holder configured to receive the control circuit therein is attached to one of the cell holders. Thus, the control circuit may be mounted to the module even if the electrochemical cell module does not include the case. Consequently, the cost for the case may be reduced. Since the electrochemical cell module is not surrounded by the case, heat dissipation efficiency of the electrochemical cell module may be increased. Further, by separately passing the voltage detection wires and the signal wires respectively through the first and second insulating guide members, the voltage detection wires and the signal wires do not interfere with each other, thereby preventing malfunction of the control circuit due to noise and so forth.

DESCRIPTION OF REFERENCE SIGNS

1 electrochemical cell module
3 lithium ion battery cell
5, 7 cell holder
6A to 6F cell terminal receiving concave portion
8A to 8F cell terminal receiving concave portion
9 control circuit holder
10 cylindrical portion
11 terminal holder
13 reinforcing metal bar
15 first insulating guide member
17 second insulating guide member
19, 21 through hole
20, 22 screw
23 bus bar receiving portion
25 control circuit substrate receiving portion
27 screw hole
29 screw
31 partition portion
33 peripheral wall portion
35 lid plate
37A through hole
37B screw hole
39 screw
41 control circuit
43 control circuit substrate
45, 47 lead wire insertion through hole
49 positive electrode terminal
51 negative electrode terminal
52 external connection terminal
53 screw hole
55 screw
57A to 57F nut
58A to 58F terminal portion
59A to 59F nut
60A to 60F terminal portion
61 bus bar
63A, 63B lead-wire lead-out hole
65A, 65B lead-wire lead-out hole
66 guide member forming part
67 engaging hook portion
68 fitting hook portion
69 engaged portion
70 fitted portion
71 fitting portion
73 fixing portion
74 screw hole

The invention claimed is:

1. An electrochemical cell module comprising:
a plurality of cylindrical electrochemical cells electrically connected to one another and arranged juxtaposedly;
a pair of cell holders configured to respectively hold both ends of the plurality of cylindrical electrochemical cells;
a control circuit operable to control voltages of the plurality of cylindrical electrochemical cells;
a control circuit holder configured to receive the control circuit therein and attached to an outside of one of the pair of cell holders; and
a terminal holder including a pair of input/output terminals through which charge and discharge current flows and an external connection terminal portion for input/output of control information to/from the control circuit, and attached to the other of the pair of cell holders, wherein
the control circuit holder includes an opposed wall portion opposed to the one of the pair of cell holders;
the opposed wall portion is formed with one or more lead wire insertion through holes;
a plurality of lead wires operable to electrically connect the plurality of cylindrical electrochemical cells and the control circuit are inserted into the control circuit holder through the one or more lead wire insertion through holes;
the plurality of lead wires and the control circuit are connected via a connector;
the plurality of lead wires comprise:
voltage detection wires extending from the respective cylindrical electrochemical cells to the control circuit and operable to detect voltages of the respective cylindrical electrochemical cells; and
signal wires extending from the control circuit to the external connection terminal portion located in the other of the pair of cell holders;

a first insulating guide member and a second insulating guide member are disposed between the pair of cell holders and each have a passage therein;

the voltage detection wires are passed through the passage of the first insulating guide member; and the signal wires are passed through the passage of the second insulating guide member.

2. The electrochemical cell module according to claim 1, wherein:

the first and second insulating guide members each have a splittable structure to be split into two at a splitting plane assumed along the passage.

* * * * *